United States Patent
Hanyu (10) Patent No.: US 7,359,155 B2
(45) Date of Patent: Apr. 15, 2008

(54) SLIDER, HEAD ASSEMBLY AND DISK APPARATUS

(75) Inventor: Mitsunobu Hanyu, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 438 days.

(21) Appl. No.: 10/993,513

(22) Filed: Nov. 22, 2004

(65) Prior Publication Data

US 2005/0213251 A1 Sep. 29, 2005

(30) Foreign Application Priority Data

Mar. 29, 2004 (JP) ............................ P2004-097022

(51) Int. Cl.
*G11B 21/21* (2006.01)
*G11B 5/60* (2006.01)

(52) U.S. Cl. ............................... 360/236.3; 360/235.7; 360/237

(58) Field of Classification Search ............. 360/236.1, 360/236.3, 235.5, 235.7, 237
See application file for complete search history.

(56) References Cited

U.S. PATENT DOCUMENTS

| | | | |
|---|---|---|---|
| 5,708,540 A | * | 1/1998 | Ananth et al. ........... 360/235.4 |
| 6,446,409 B1 | | 9/2002 | Emerson |
| 6,525,909 B1 | * | 2/2003 | Qian et al. ............... 360/235.7 |
| 2002/0040594 A1 | * | 4/2002 | Matsui et al. ................. 73/104 |
| 2002/0075593 A1 | * | 6/2002 | Ultican et al. .............. 360/122 |
| 2003/0090833 A1 | * | 5/2003 | Tani et al. ................... 360/110 |
| 2003/0213118 A1 | | 11/2003 | Tadepalli et al. |
| 2003/0218832 A1 | | 11/2003 | Tsuchiyama et al. |
| 2004/0150913 A1 | * | 8/2004 | Yoshida et al. .......... 360/235.5 |

FOREIGN PATENT DOCUMENTS

| | | |
|---|---|---|
| JP | 2003-308671 | 10/2003 |
| WO | WO 99/48098 | 9/1999 |

* cited by examiner

*Primary Examiner*—William J Klimowicz
(74) *Attorney, Agent, or Firm*—Pillsbury Winthrop Shaw Pittman LLP (57) ABSTRACT

Disclosed is a slider which is substantially rectangular and has a disc facing surface with an air inflow end and an air outflow end in the longitudinal direction, comprising a first positive pressure-generating section disposed near the air inflow end; a pair of second positive pressure-generating sections disposed separately in the breadth direction in an air outflow end side away from the first positive pressure-generating section; a negative pressure-generating section disposed in an air outflow end side from the first positive pressure-generating section; and a third positive pressure-generating section disposed in an air outflow end side from the negative pressure-generating section and has a maximum size, which is 25% or less of the longitudinal size, in the same direction as the longitudinal direction and a maximum size, which is 45% or more of the breadth size of the disc facing surface, in a direction perpendicular to the longitudinal direction.

3 Claims, 10 Drawing Sheets

Rotation

| Size of disk facing surface | | Size of positive pressure-generating section 84 in air outflow end side | | L3/L | W3/W |
|---|---|---|---|---|---|
| Length L | Width W | Maximum length L3 in direction L | Maximum length W3 in direction W | | |
| 850 μm | 700 μm | 165 μm | 340 μm | 19.4% | 48.6% |

| | Size of disk facing surface | | Size of positive pressure-generating section 84 in air outflow end side | | L3/L | W3/W |
|---|---|---|---|---|---|---|
| | Length L | Width W | Maximum length L3 in direction L | Maximum length W3 in direction W | | |
| a | 850 μm | 700 μm | 167.3 μm | 400 μm | 19.7% | 57.1% |
| b | ↑ | ↑ | 191.3 μm | 350 μm | 22.5% | 50.0% |
| c | ↑ | ↑ | 212.5 μm | 315 μm | 25.0% | 45.0% |
| d | ↑ | ↑ | 267.8 μm | 250 μm | 31.5% | 35.7% |
| e | ↑ | ↑ | 334.7 μm | 200 μm | 39.4% | 28.6% |

| Xside[μm] | Hside[μm] | Hside−Hmin[μm] | Hside/L[%] |
|---|---|---|---|
| 0 | 1.00E-2 | 0.00E0 | 0.0 |
| 50 | 1.28E-2 | 2.79E-3 | 5.9 |
| 100 | 1.58E-2 | 5.85E-3 | 11.8 |
| 150 | 1.92E-2 | 9.19E-3 | 17.6 |
| 170 | 2.06E-2 | 1.06E-2 | 20.0 |
| 200 | 2.28E-2 | 1.28E-2 | 23.5 |
| 235 | 2.55E-2 | 1.55E-2 | 27.6 |

SLIDER, HEAD ASSEMBLY AND DISK APPARATUS

CROSS REFERENCE TO RELATED APPLICATIONS

This application is based upon and claims the benefit of priority from the prior Japanese Patent. Application No. 2004-97022 filed on Mar. 29, 2004; the entire contents of which are incorporated herein by reference.

BACKGROUND

1. Field of the Invention

The present invention relates to a slider, a head assembly and a disc apparatus, and more particularly to a slider suitable for improvement of floating stability, a head assembly having the slider and a disc apparatus having the head assembly.

2. Description of the Related Art

The slider is a member for stably floating a head element above a medium such as a rotating magnetic disc by means of air lubrication. The general structure of the slider is disclosed in, for example, the following patent document 1 and patent document 2. The disc facing surface of the slider has a protruded positive pressure-generating section on four portions, namely the side of an air inflow end, the side of an air outflow end and one pair of portions separated from each other in the breadth direction. In addition, a recessed negative pressure-generating section is formed in substantially the center of the disc facing surface. Besides, a curved portion called as a crown is formed on the disc facing surface of the slider in its longitudinal direction, and a curved portion called as a camber is also formed in a direction perpendicular to the longitudinal direction.

[Patent Document 1] Japanese Patent Laid-Open Application No. 2003-308671

[Patent Document 2] PCT International Publication No. WO-A1 99/48098

In recent years, with miniaturization of the disc apparatus, the slider has also become small. The size of the slider is standardized by IDEMA (International Disc Drive Equipment and Materials Association) and the slider is named as a mini-slider, a micro-slider, a nano-slider, a pico-slider and a femto-slider in decreasing order of size. Among them, the femto-slider having a disc facing surface of about 850 μm×700 μm is particularly hard to improve an air film rigidity in a roll direction. Thus, a change in floating amount involved in variations in steady attitude in the roll direction (roll static attitude: RSA) and a deviation of a load point in the roll direction by suspension might become problems.

SUMMARY

The present invention has been made in view of the above circumstances and provides a slider, a head assembly and a disc apparatus capable of decreasing variations in a slider floating amount.

According to an aspect of the present invention, there is provided a slider which is substantially rectangular and has a disc facing surface with an air inflow end at one end in the longitudinal direction of the rectangular slider and an air outflow end at the other end, comprising a first positive pressure-generating section which is disposed near the air inflow end of the disc facing surface; a pair of second positive pressure-generating sections which are disposed separately in the breadth direction of the disc facing surface perpendicular to the longitudinal direction in a side of the air outflow end away from the first positive pressure-generating section of the disc facing surface; a negative pressure-generating section which is disposed in an air outflow end side from the first positive pressure-generating section of the disc facing surface; and a third positive pressure-generating section which is disposed in an air outflow end side from the negative pressure-generating section of the disc facing surface and has a maximum size, which is 25% or less of the longitudinal size of the disc facing surface, in the same direction as the longitudinal direction and a maximum size, which is 45% or more of the breadth size of the disc facing surface, in a direction perpendicular to the longitudinal direction.

Specifically, the third positive pressure-generating section disposed closest to the air outflow end has a size falling in a prescribed range with respect to the size of the disc facing surface. Thus, the crown dependence of a force produced when the slider is floated is reduced, and the air film rigidity in the roll direction is enhanced. As a result, it is possible to decrease a variation in the slider floating amount.

The head assembly according to an aspect of the present invention is an assembly incorporating the above-described slider therein. In addition, the disc apparatus according to an aspect of the present invention is an apparatus incorporating such a head assembly in it.

According to the present invention, the slider, the head assembly and the disc apparatus can decrease a change in the slider floating-amount.

DETAILED DESCRIPTION (Description of Examples)

Embodiments of the present invention are described with reference to the drawings, which are provided for illustration only and do not limit the present invention in any respect.

As a form of an embodiment of the present invention, the size from the ends of the one pair of second positive pressure-generating sections on the side of the air outflow end to the air outflow end on the disc facing surface can be 20% or more of the longitudinal size of the disc facing surface. This limitation substantially separates additionally the second positive pressure-generating section, which might become closest to a medium, from the medium and can effectively prevent a collision to the medium.

Figure 1:
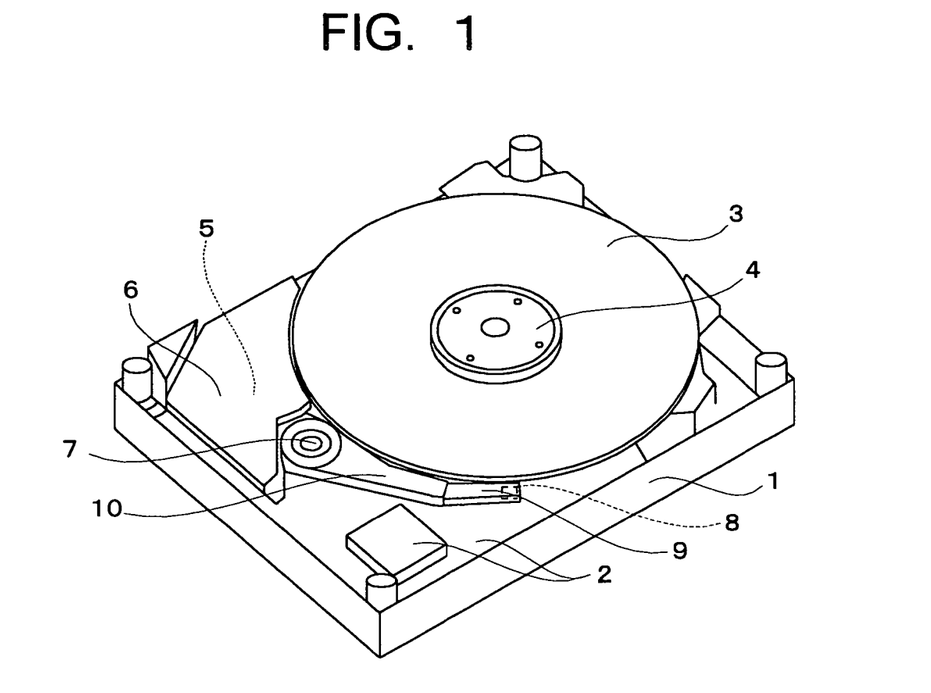
FIG. 1 is a perspective view showing a structure of an embodiment applying the present invention to a magnetic disc apparatus.

Embodiments of the present invention will be described with reference to the accompanying drawings. FIG. 1 is a perspective view showing the structure of an embodiment that is applying the present invention to a magnetic disc apparatus. As shown in FIG. 1, this magnetic disc apparatus has as major components a base 1, a wiring substrate unit 2, a magnetic disc 3, a disc damper 4, a voice coil motor 5, a top yoke 6, a pivot 7, a slider 8, a suspension (suspension member) 9, and an arm 10. The relationship among those components is known as a magnetic disc apparatus, but their respective functions will be described.

The base 1 is a lower outside container member for housing the inside components of the magnetic disc apparatus and configures a disc enclosure (container) together with an unshown top cover (upper outside container member). The base 1 has mechanical and electrical inside components assembled in it as shown in the drawing. The wiring substrate unit 2 is a substrate for mounting electric/electronic circuit parts for executing electrical processing. The electrical processing includes signal processing for writing on or reading from the magnetic disc 3, control processing of the voice coil motor 5 and a spindle motor (not shown in a lower position of the disc damper 4) and the like.

The magnetic disc 3 is a disc medium for recording and holding information as a magnetic pattern and generally called a hard disc. Reading from or writing new information on the disc is made by a head element attached to a leading end of the slider 8. The magnetic disc 3 is rotatably supported by the disc clamper 4 and rotated at a prescribed rotating speed by the spindle motor.

The voice coil motor 5 has a structure including the top yoke 6 and a bottom yoke (not shown in a lower position of the top yoke 6) and pivots the arm 10 about the pivot 7 by them. Thus, the head element on the leading end of the slider 8 is moved to any radial position on the magnetic disc 3. The top yoke 6 and the bottom yoke are magnetic field generating members for the voice coil motor 5. The pivot 7 rotatably supports one end of the arm 10 so to integrally pivot the arm 10, the suspension 9 mounted on its end, and the slider 8 having the head element mounted on its leading end.

The slider 8 is a member for floating and positioning the head element stably above the rotating magnetic disc 3 by air lubrication and has the head element on its leading end (opposite to the pivot 7). The suspension 9 supports the slider 8 from its above and is cantilevered from an end of the arm 10 to deform elastically so to generate a downward pushing force at the end of the slider 8 side. The downward pushing force is opposed to a floating force generated in the slider 8 by air lubrication. The arm 10 has its one end pivotably supported by the pivot 7 and the other end attached to one end of the suspension 8.

Figure 2:
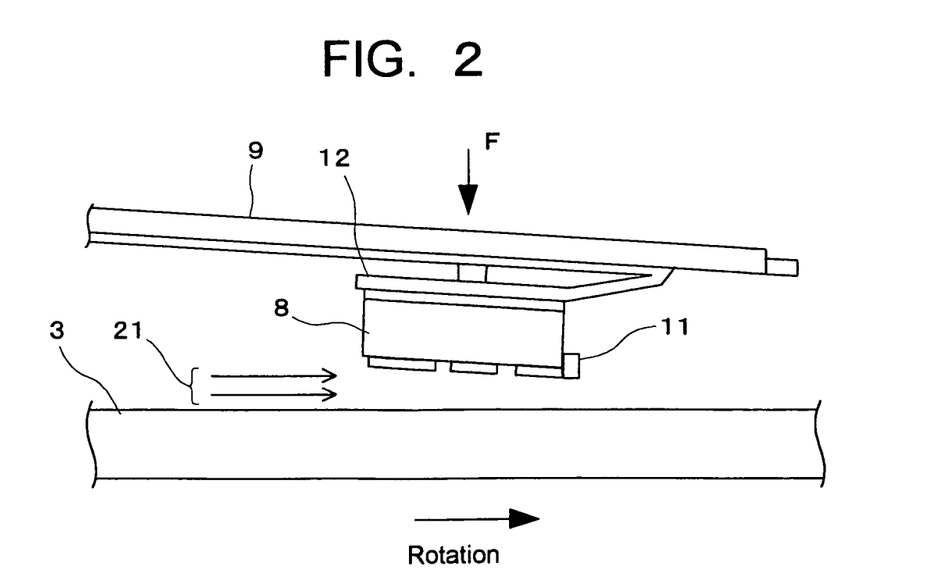
FIG. 2 is a side view showing a magnified image of a slider 8 and its vicinity shown in FIG. 1.

FIG. 2 is a side view showing a magnified image of the slider 8 and its vicinity shown in FIG. 1. In FIG. 2, the same reference numerals are allotted to the same elements as those shown in FIG. 1 and their description is omitted. As shown in FIG. 2, when the slider 8 and the suspension 9 are located above the magnetic disc 3, the rotations of the magnetic disc 3 produce airflow 21 in the same direction as the rotation direction near the surface of the magnetic disc 3. Thus, a force is produced in a direction of floating the slider 8. The floating force and a downward pushing force F by the elastic deformation of the suspension 9 are opposed to each other. This balance between them causes a head element 11 attached to the leading end of the slider 8 to have an appropriate floating position above the magnetic disc 3. At this time, the floating attitude of the slider 8 generally has a pitch angle and a roll angle. Reference numeral 12 indicates a gimbal spring which mediates the attachment of the slider 8 to the suspension 9. The slider 8 has an air inflow end on its left and an air outflow end on its right in FIG. 2.

Figure 3A:
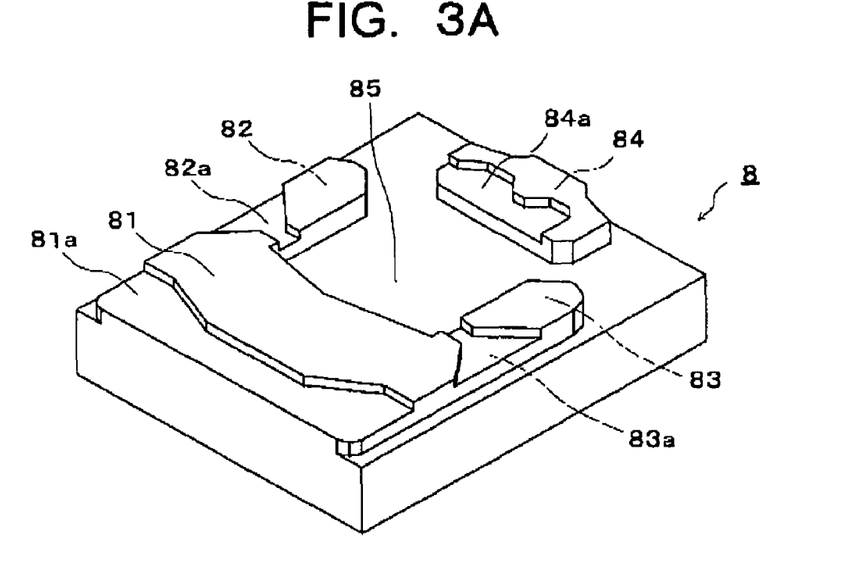
FIG. 3A and FIG. 3B are a perspective view and a plan view showing a magnified image of the structure of only the slider 8 (namely, the slider according to one embodiment of the present invention) shown in FIG. 2.
Figure 3B:
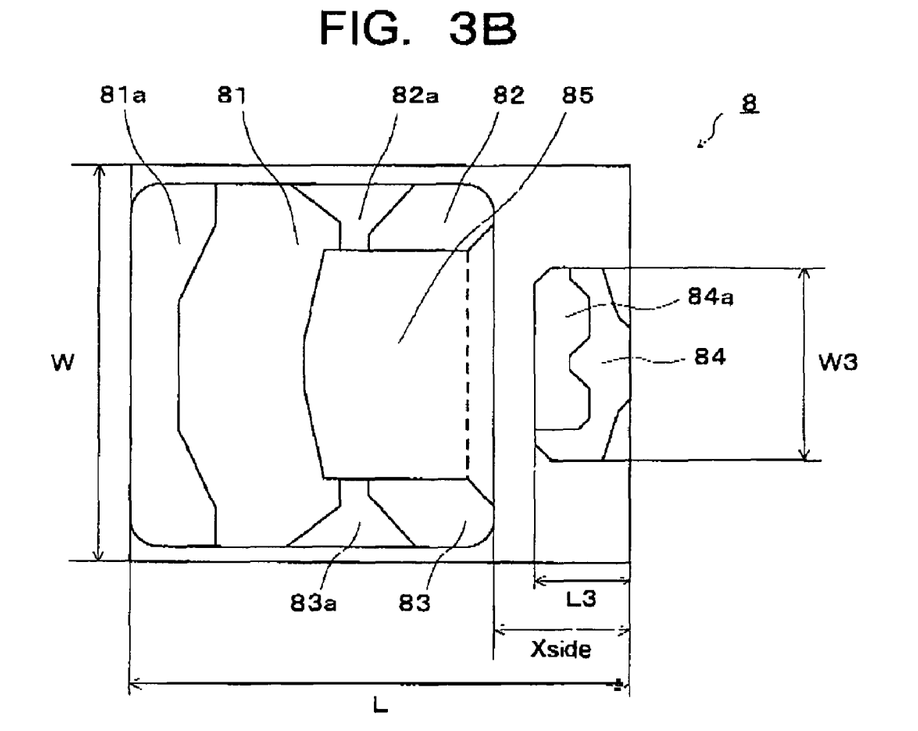

FIG. 3A and FIG. 3B are a perspective view (FIG. 3A) and a plan view (FIG. 3B) showing a magnified image of the structure of only the slider 8 (specifically, the slider according to an embodiment of the present invention) shown in FIG. 2. In FIG. 3A and FIG. 3B, the surface shown as the top surface is a surface opposed to the magnetic disc 3, and its longitudinal direction (direction of dimension L) agrees roughly with a direction to which the magnetic disc 3 progresses relatively. FIG. 3B shows an air inflow end on its left and an air outflow end on its right.

As shown in FIG. 3A and FIG. 3B, the slider 8 has a first positive pressure-generating section 81 having a protruded surface near the air inflow end, one pair of second positive pressure-generating sections 82, 83 having a protruded surface on the side of the air outflow end away from the first positive pressure-generating section 81, and a third positive pressure-generating section 84 having a protruded surface on the side of the air outflow end. The second positive pressure-generating sections 82, 83 are separated from each other in a breadth direction (direction of dimension W) of the slider 8. A first step portion 81a is formed on the side of the air inflow end of the first positive pressure-generating section 81, one pair of second step portions 82a, 83a are formed on the side of the air inflow end of the second positive pressure-generating sections 82, 83, and a third step portion 84a is formed on the side of the air inflow end of the third positive pressure-generating section 84. Those step portions 81a, 82a, 83a, 84a each have a height somewhat lower than that of each of the positive pressure-generating sections 81, 82, 83, 84. The lowered amount is, for example, 0.1 μm.

On the air outflow end side of the first positive pressure-generating section 81 in substantially the midsection of the magnetic disc facing section of the slider 8, a negative pressure-generating section 85 having a recessed surface is formed. The negative pressure-generating section 85 is formed to be lower than the step portions 81a, 82a, 83a, 84a.

For example, the lowered amount from the heights of the positive pressure-generating sections 81, 82, 83, 84 is 1 μm.

For the slider 8, for example, ceramics such as AlTiC or the like is used as a material and its surface is fabricated by physical etching to produce it. The slider 8 has a longitudinal direction length L of, for example, 850 μm and a width of, for example, 700 μm in a direction perpendicular to the longitudinal direction. The slider 8 is classified into a so-called femto-slider in terms of size. On the slider 8, a maximum length L3 in the direction L of the third positive pressure-generating section 84 and a maximum length W3 in the direction W are determined under prescribed limitations. This point will be further described later with reference to FIG. 5. A dimension from the air outflow side end of each of the second positive pressure-generating sections 82, 83 to the air outflow end on the magnetic disc facing surface of the slider 8 is determined to be Xside. The dimension Xside will be further described with reference to FIG. 13A and FIG. 13B.

Figure 4:
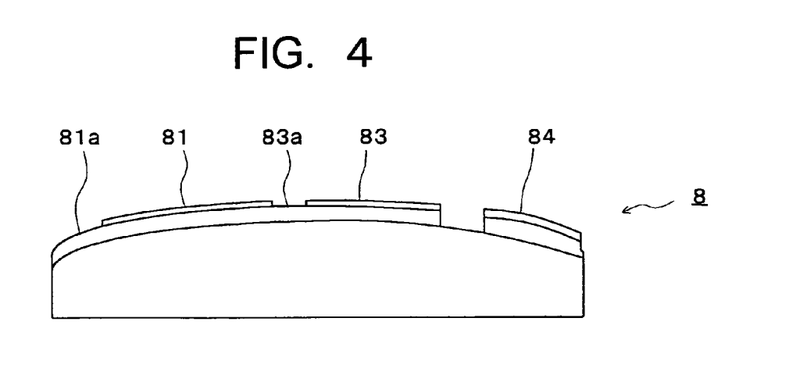
FIG. 4 is a side view illustrating a slider crown.

FIG. 4 is a side view illustrating the crown of the slider 8. In FIG. 4, the same reference numerals are allotted to the same elements as those shown in FIG. 3A and FIG. 3B. It is not shown in FIG. 3A and FIG. 3B, but the slider 8 has its surface opposed to the magnetic disc curved to have an arc shape in the direction of the dimension L. The swell amount of the facing surface because of the roundness is determined as an index indicating a level of the crown. When this index is zero, the roundness is none, and when it is large, the roundness is tight.

The slider 8 has the swell amount, namely the crown, determined to be 7 nm to 10 nm in name. The swell has an effect of decreasing the interval between the second positive pressure-generating sections 82, 83 and the magnetic disc 3 to enhance the air film rigidity by the second positive pressure-generating sections 82, 83. It is known that the crown in practical use is changed (decreased) from the nominal quantity because of various deforming causes such as a temperature change of the slider 8. The general slider can also have its facing surface to the magnetic disc rounded in the direction of the dimension W. This roundness is called a camber. The camber may be formed on the slider 8.

Figure 5:
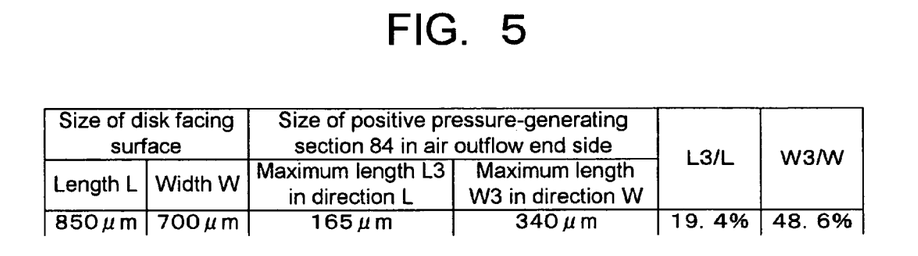
FIG. 5 is a table showing some of specifications of the slider 8 shown in FIG. 3A and FIG. 3B.

FIG. 5 is a table showing some of specifications of the slider 8 shown in FIG. 3A and FIG. 3B, and some of them have been described above. The third (=on the side of the air outflow end) positive pressure-generating section 84 is determined its size under the prescribed limitations as described above, namely the maximum length L3 in the direction L is 165 μm, and the maximum length W3 in the direction W is 340 μm. Then, L3/L is 19.3%, and W3/W is 48.6%.

Figure 6:
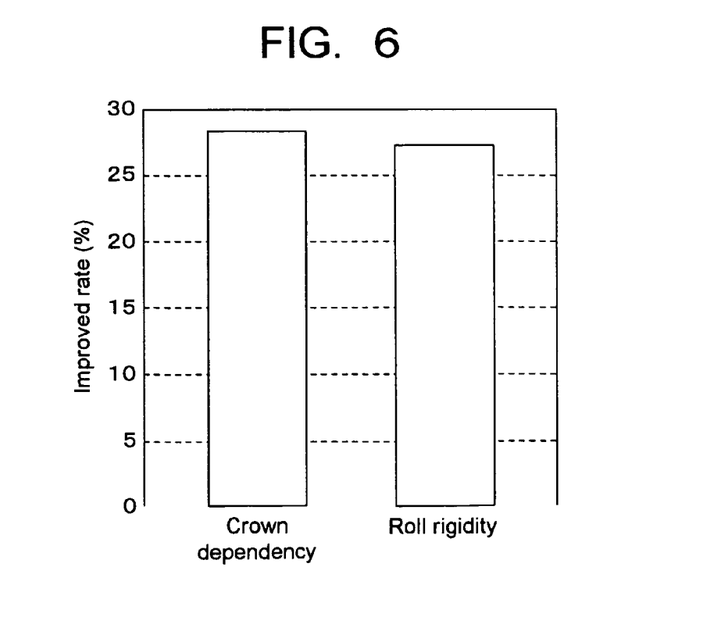
FIG. 6 is a diagram showing improvements of properties by the slider 8 shown in FIG. 3A and FIG. 3B as an improvement rate from a reference example.

FIG. 6 is a diagram showing improvements of properties by the slider 8 shown in FIG. 3A and FIG. 3B as an improvement rate from a reference example. The reference example is a slider having the same facing surface size as that of the slider 8 shown in FIG. 3A and FIG. 3B except that only the third positive pressure-generating section 84 was changed (increased) to have L3=215 μm and changed (decreased) to have W3=320 μm. Then, L3/L is 25.3%, and W3/W is 45.7%. FIG. 6 shows a result determined by calculating the crown dependence and roll rigidity of the reference example slider and the slider 8 shown in FIG. 3A and FIG. 3B by numerical analysis and determining an improvement factor in percentage from the reference example. The crown dependence here is a change rate of a force generated in the slider when the crown changes from 10 nm to 0 nm. The roll rigidity is an air film rigidity of the slider in its roll direction (pivoting direction about the L directional axis of the slider). In the analysis, a floating attitude of the slider 8 has a minimum floating height of 10 nm at the air outflow end, a pitch angle of 200 μrad, and a roll angle of 0 μrad.

As shown in FIG. 6, the slider 8 shown in FIG. 3A and FIG. 3B has its crown dependence and roll rigidity improved by a little less than 30% in comparison with the reference example. Such an improvement allows decreasing a change in the slider floating amount. This is because a change in the force generated in the slider is small against variations in production, a deformation due to temperatures or the like of the crown, and rolling occurs hardly as the air film rigidity in the roll direction is improved.

Figure 7:
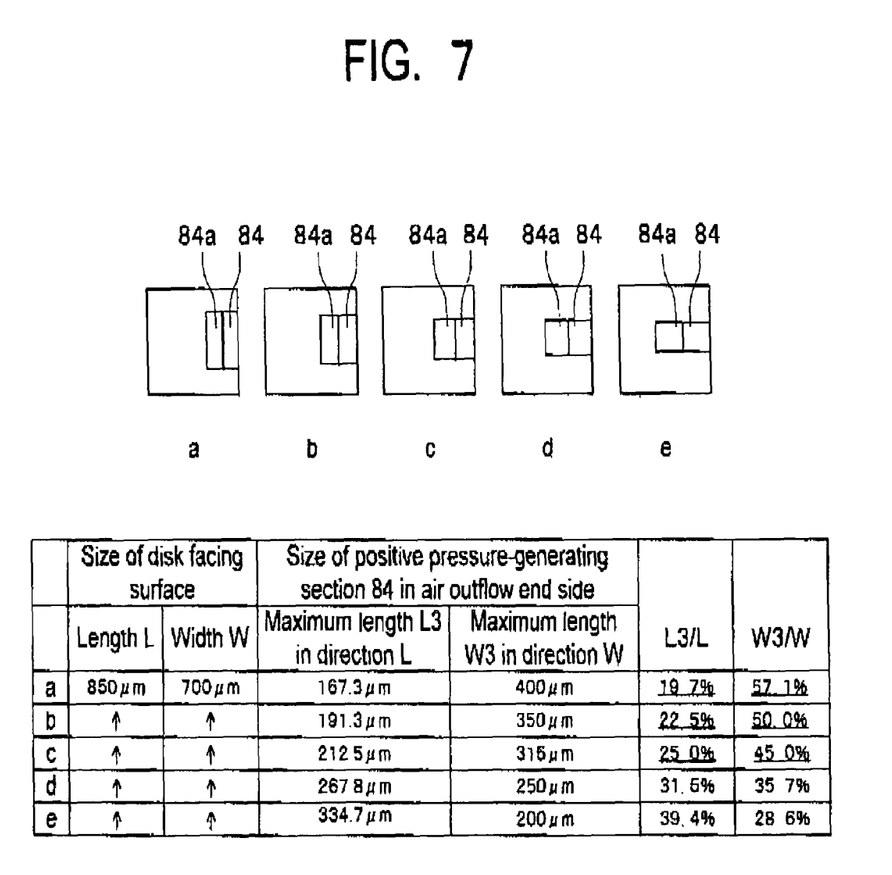
FIG. 7 is a diagram showing sample structures assumed in order to study maximum length and width sizes of positive pressure-generating sections on the side of an air outflow end.

Reasons of setting the sizes of the third (=on the side of the air outflow end) positive pressure-generating section 84 to L3/L=19.3% and W3/W=48.6% will be described below. FIG. 7 is a diagram showing sample structures assumed in order to study the maximum length and width sizes of the positive pressure-generating section on the side of the air outflow end. Each sample shown in FIG. 7 was undergone numerical analysis for evaluation of various parameters as described in the next paragraph and following. Samples a to e are determined to have the third positive pressure-generating section 84 and the third step portion 84a only and have their aspect ratios (length-to-width ratios) only changed as shown in the drawing, respectively. The positive pressure-generating section 84 and the step portion 84a shown in a plane shape are also simplified as a rectangle and have the same area. The depth (lowered amount) of the step portion 84a from the positive pressure-generating section 84 is 0.1 μm, and the depth of the step portion 84a on the side of the air inflow end is 1 μm from the positive pressure-generating section 84. In addition, the swell amount (the crown) is 10 nm.

Figure 8:
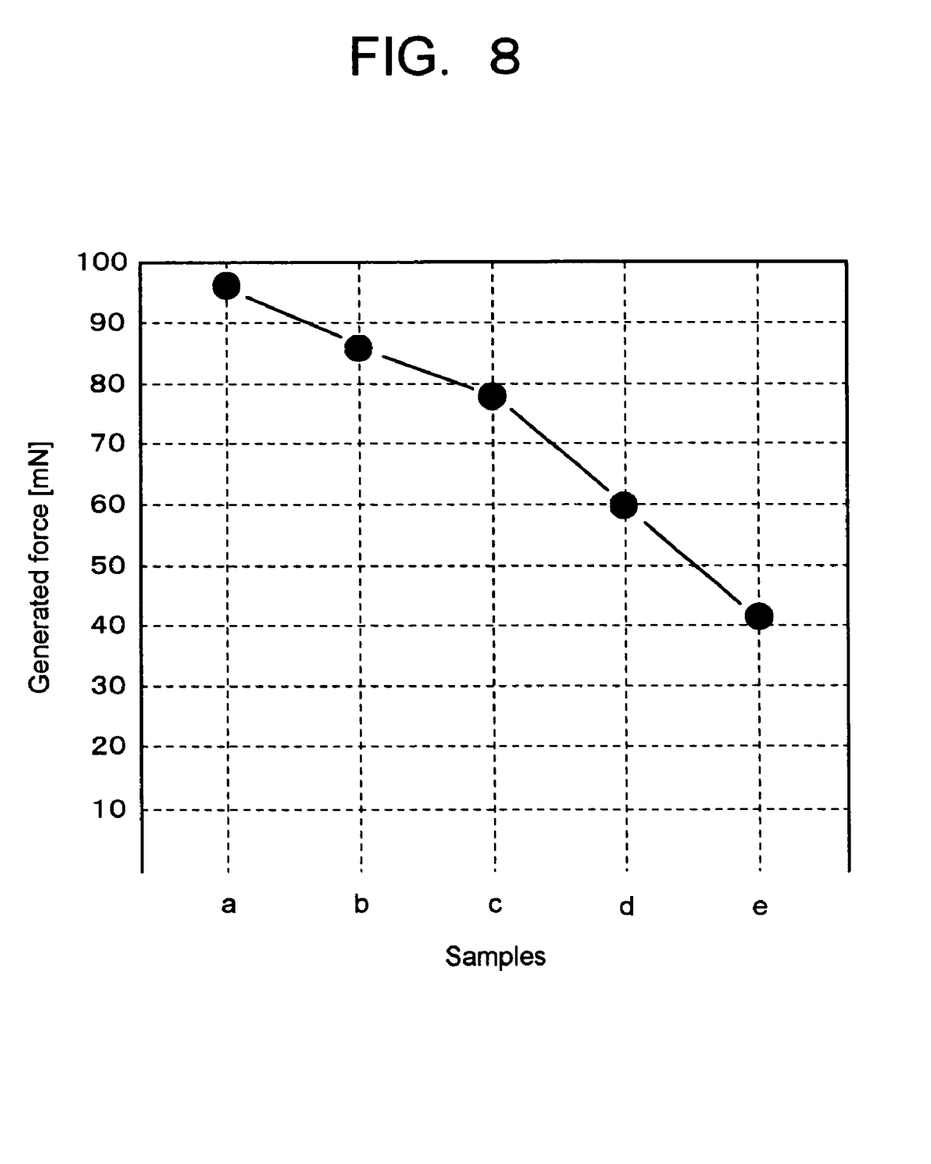
FIG. 8 is a diagram showing a result obtained by analyzing a force produced in each sample shown in FIG. 7.

FIG. 8 is a diagram showing a result determined by analyzing a force generated in each sample of FIG. 7 when floated above a magnetic disc. FIG. 8 shows that, if the positive pressure-generating sections 84 have the same area, the slider 8 having the positive pressure-generating section 84 which is broader in the breadth direction is advantageous to generate the force. The slider such as a femto-slider having a small facing surface area has a tendency to have a small generated force. Therefore, it is significant to set that the positive pressure-generating section 84 closest to the side of the air outflow end has such a shape that it is large in a breadth direction and small in a length direction.

Figure 9:
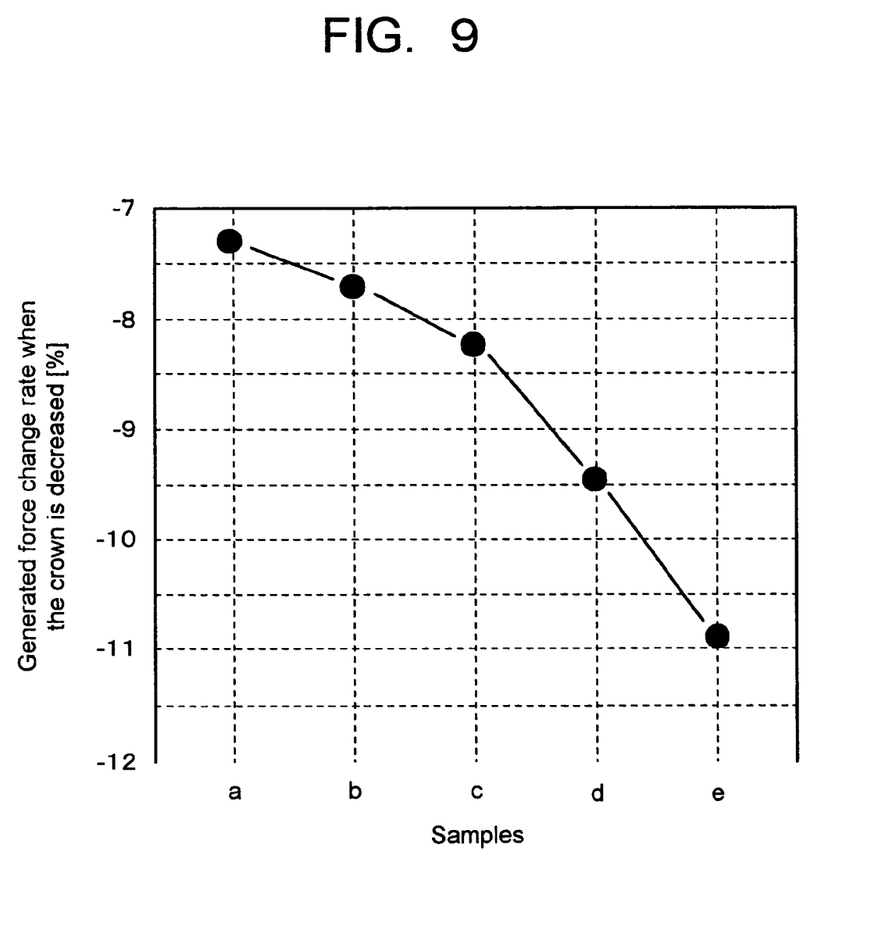
FIG. 9 is a diagram showing a result determined by analyzing a change rate of a generated force when the crown of each sample shown in FIG. 7 is decreased.

FIG. 9 is a diagram showing a result determined by analyzing a change rate of the generated force when the crown of each sample shown in FIG. 7 is decreased. Here, it is assumed that the swell amount (the crown) decreases from 10 nm to 0 nm. It is seen from the result shown in FIG. 9 that, in the case that the positive pressure-generating section 84 on the side closest to the air outflow end is set to have a shape that it is large in the breadth direction and small in the length direction, the generated force change rate when the crown is decreased is relatively smaller than those of the other sections 84. This matter does not detrimental to the result shown in FIG. 8.

Figure 10:
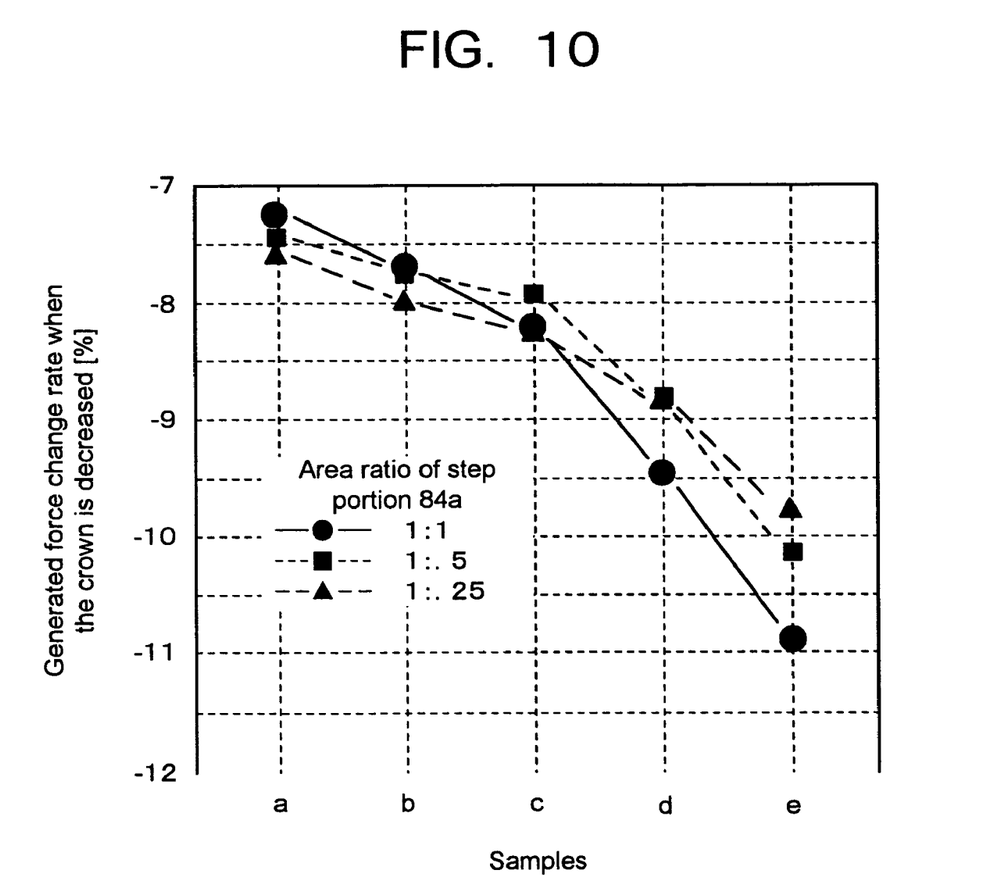
FIG. 10 is a diagram showing results determined by analyzing a change rate of a generated force when the crown is decreased with the area ratio of a step portion further varied with respect to the result shown in FIG. 9.

FIG. 10 is a diagram showing results determined by analyzing a change rate of the generated force with the crown decreased when the area ratio of the step portion 84a is further changed with respect to the result shown in FIG. 9. In the drawing, square plotted points indicate the results obtained when the area of the step portion 84a was changed to 0.5 time and triangle plotted points indicate the results obtained when changed to 0.25 time (round plotted points are identical to those shown in FIG. 9). It is seen from the results of FIG. 10 that the change in the step portion 84a does not change substantially the general tendency. In other words, it is shown that a generated force change rate when the crown is decreased mainly depends on the shape and area of the positive pressure-generating section 84.

Figure 11:
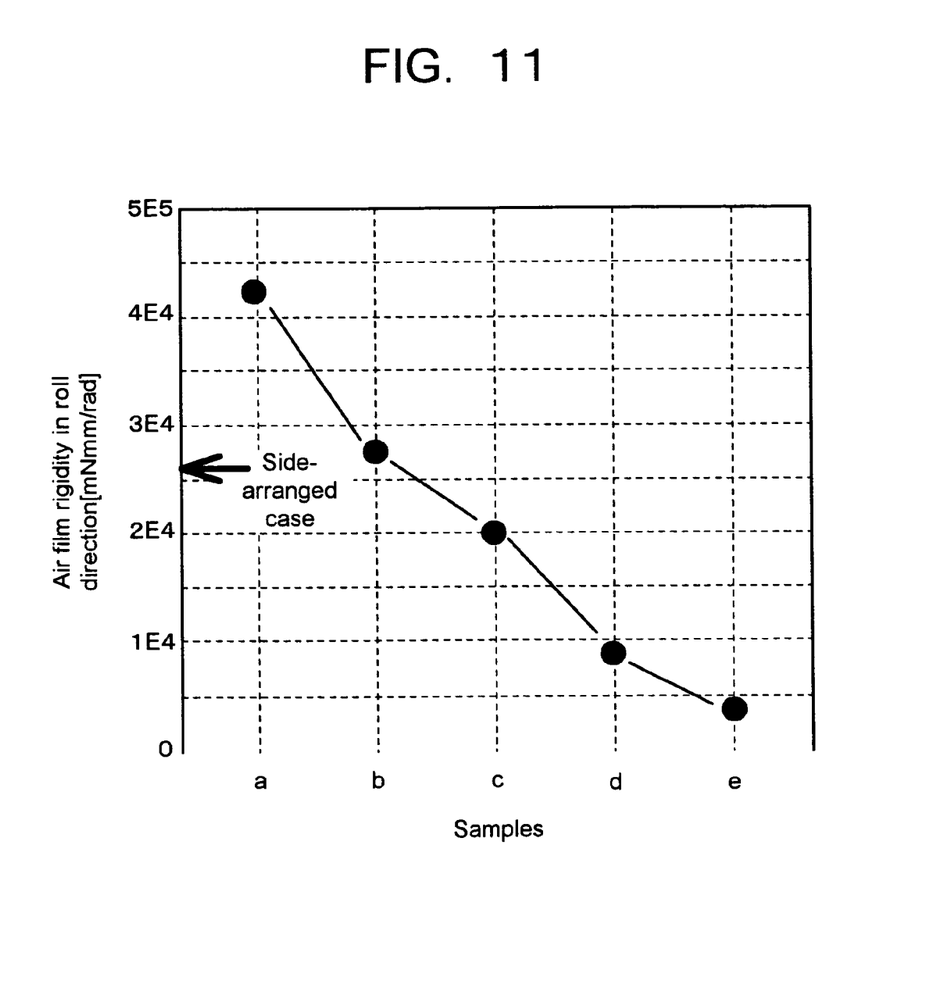
FIG. 11 is a diagram showing a result determined by analyzing an air film rigidity in a roll direction of each sample shown in FIG. 7.

FIG. 11 is a diagram showing a result determined by analyzing the air film rigidity in the roll direction of each of the samples shown in FIG. 7. It is also seen from the result shown in FIG. 11 that the air film rigidity in the roll direction becomes high when the positive pressure-generating section 84 on the side closest to the air outflow end is set to have a shape that it is large in the breadth direction and small in the length direction. This result is not detrimental to the results shown in FIG. 8 and FIG. 9.

Figure 12A:
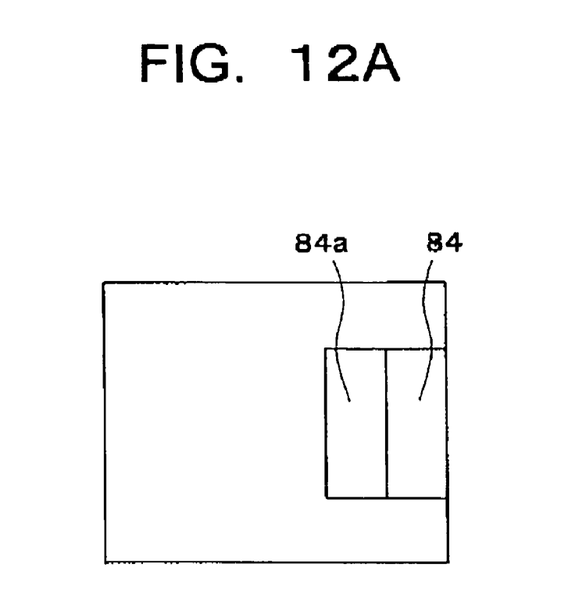
FIG. 12A and FIG. 12B are plan views showing comparison of the structures of sliders each having a positive pressure-generating section of the same area, the positive pressure-generating section of FIG. 12B being divided into two and disposed on each side.
Figure 12B:
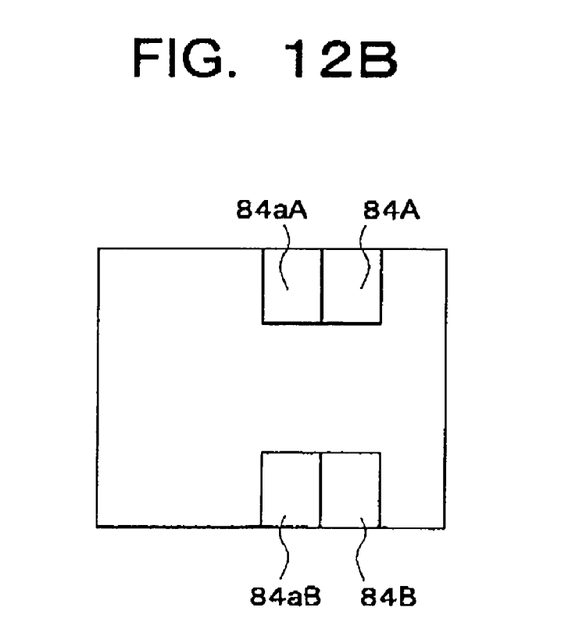

FIG. 12A and FIG. 12B are plan views showing comparison of the structures of sliders having the same area of the positive pressure-generating section on the air outflow side but FIG. 12B has the positive pressure-generating section divided into two and arranged on each side. FIG. 12A shows the same one as the sample a of FIG. 7. The slider having the structure (the structure having positive pressure-generating sections 84A, 84B and step portions 84aA, 84aB which are disposed on each side) shown in FIG. 12B was analyzed in the same way as in FIG. 11. As a result, the air film rigidity values as shown in the "side arrangement" in FIG. 11 were obtained. It is seen that the air film rigidity value of the sample a is about 60% higher than that of the "side arrangement". It indicates that the femto-slider has a higher tendency that a roll rigidity is obtained by the positive pressure-generating section 84 located in the center in the breadth direction. In other words, appropriate setting of the positive pressure-generating section 84 is important means for improving the roll rigidity.

With all the results shown in FIG. 8 to FIG. 11 taken into consideration, setting of the positive pressure-generating section 84 on the side closest to the air outflow end to have a shape that it is large in the breadth direction and small in the length direction provides favorable results in evaluation of all the parameters. In practical designing, it is conceivable that the positive pressure-generating section 84 having the shape with a tendency toward the sample c to the sample a can be selected. The slider 8 shown in FIG. 3A and FIG. 3B is based on such a concept. Specific geometrical shapes of the first, second and third positive pressure-generating sections 81, 82, 83, 84 are not limited to the one shown in FIG. 3A and FIG. 3B but may be any shape if it does not cause any adverse effect on the slider performance.

Then, a preferable embodiment of the arrangement of the second positive pressure-generating sections 82, 83 will be described. Generally, the slider floats at a pitch angle and a roll angle with respect to the disc surface. Therefore, if the second positive pressure-generating sections 82, 83 are disposed on the side excessively closer to the air outflow end of the slider 8, the space between the ends of the second positive pressure-generating sections 82, 83 in the air outflow end side and the magnetic disc surface becomes narrow, and if the space is narrower, the ends of the second positive pressure-generating sections 82, 83 in the air outflow end side might become lower than the minimum floating position of the third positive pressure-generating section 84. In other words, the second positive pressure-generating sections 82, 83 are disposed on each end in the breadth direction of the slider 8, so that they come much closer to the disc surface by virtue of the roll angle.

As described above, in the case that the ends of the second positive pressure-generating sections 82, 83 in the air outflow end side are close to the disc surface, if a change in floating amount or attitude of the slider 8 occurs unexpectedly, there is a possibility that the second positive pressure-generating sections 82, 83 come into collision with the disc surface, and the device reliability is degraded. Thus, it is advisable to consider the restrictions on the arrangement of the second positive pressure-generating sections 82, 83 (namely, the size from the ends of the second positive pressure-generating sections 82, 83 in the air outflow end side to the air outflow end of the slider 8) in order to secure additional floating stability of the slider 8.

Figure 13A:
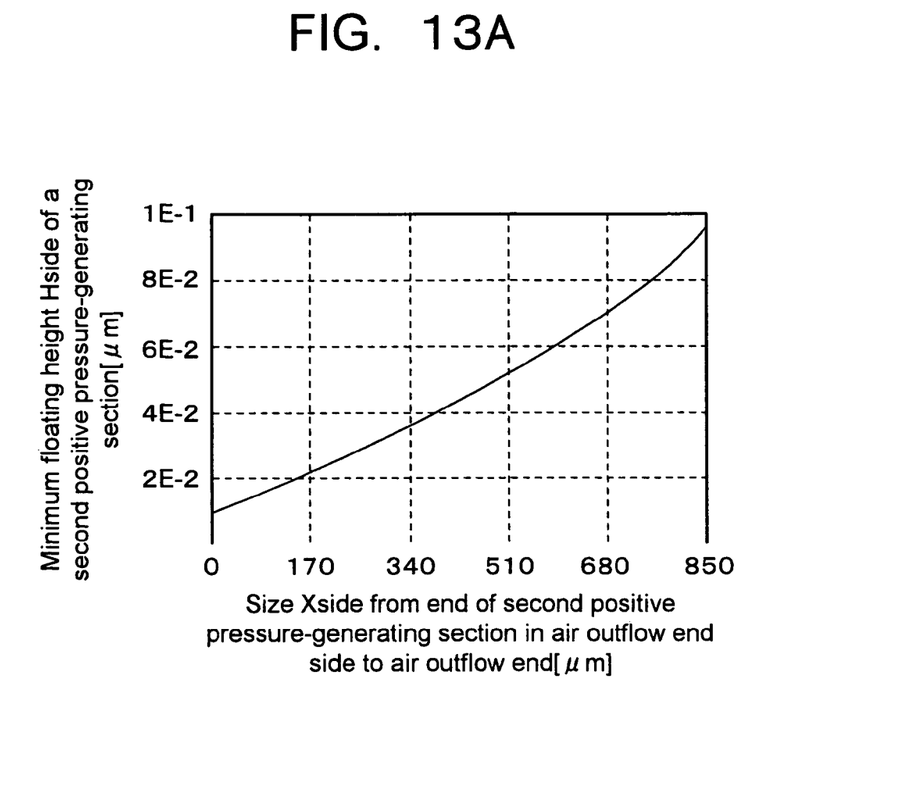
FIG. 13A, FIG. 13B are diagrams showing results obtained by calculating minimum floating height of a second positive pressure-generating section of the slider 8 shown in FIG. 3A and FIG. 3B in relation to the dimensions from the end on the side of the air outflow end of the second positive pressure-generating section to the air outflow end on the slider 8.
Figure 13B:
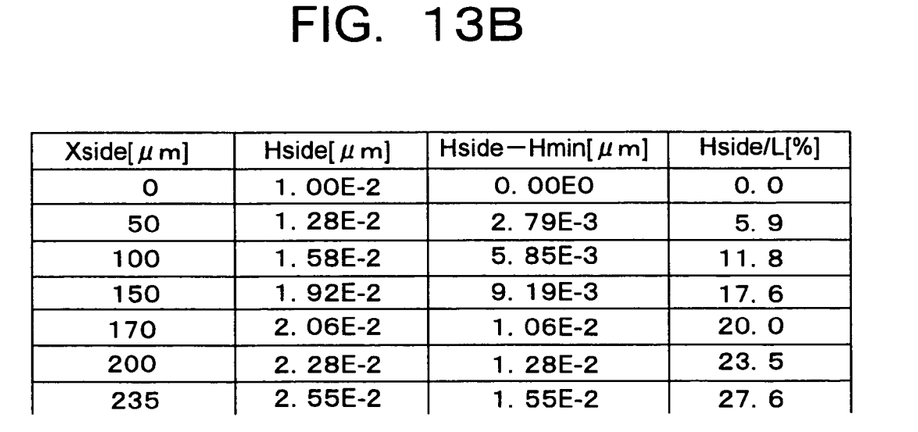

FIG. 13A and FIG. 13B are diagrams showing results obtained by calculating minimum floating height Hside of the second positive pressure-generating sections 82, 83 of the slider 8 shown in FIG. 3A and FIG. 3B in relation to size Xside from the ends of the second positive pressure-generating sections 82, 83 in the air outflow end side to the air outflow end of the slider 8. The results are shown as a graph in FIG. 13A and as a table in FIG. 13B. The third positive pressure-generating section 84 has minimum floating height $Hmin=1.00E-2$ [µm], pitch angle $P=1.00E-4$ [rad], crown (swell amount) $Cr=1.00E-2$ [µm], and a total length $L=850$ [µm] in the longitudinal direction of the slider 8.

The minimum floating height Hside [µm] of the second positive pressure-generating sections 82, 83 can be defined as the above-described relationship of Hmin [µm], P [rad], Cr [µm] and L [µm] by the next expression by geometrical analysis. $Hside\ (Xside, P, Cr)=4\cdot Cr\cdot Xside^2/L^2+(P-4\cdot Cr/L)\cdot Xside+Hmin$ Thus, to have the minimum floating height Hside of the second positive pressure-generating sections 82, 83 higher than the minimum floating height Hmin of the third positive pressure-generating section 84, it is seen from the above expression as a guide that $(P-4\cdot Cr/L)$ in the second term is set larger than 0 and Xside is also set somewhat large from the first term. Besides, in the case that a general floated attitude of the slider is considered, the roll angle is also incorporated, so that the minimum floating height Hside of the second positive pressure-generating sections 82, 83 is required to be higher than the minimum floating height Hmin of the third positive pressure-generating section 84 with a sufficient allowance.

In the case that the minimum floating height Hside of the second positive pressure-generating sections 82, 83 is 20% or more of the longitudinal length L of the slider 8, from the results shown in FIG. 13A and FIG. 13B, the above-described allowance becomes 1.06E-2 [µm] ($1.06\times10^{-2}$ [µm]) or more, and this is same to or more than 1.00E-2 [µm] determined as the minimum floating height Hmin of the third positive pressure-generating section 84. If there is such an allowance, it is conceivable that a possibility of collision of the second positive pressure-generating sections 82, 83 with the disc surface can be suppressed effectively even when the roll angle is given to the slider 8. The slider 8 shown in FIG. 3A and FIG. 3B has Xside=235 µm (27.6% of the length L in the longitudinal direction of the slider 8) from the ends of the second positive pressure-generating sections 82, 83 in the air outflow end side to the air outflow end.

It is to be understood that the present invention is not limited to the specific embodiments thereof illustrated herein, and various modifications may be made without deviating from the spirit and scope of the invention.

What is claimed is:

1. A femto slider which is substantially rectangular and has a disc facing surface with an air inflow end at one end in a longitudinal direction thereof and an air outflow end at another end in the longitudinal direction thereof, the femto slider comprising:

a first positive pressure-generating section which is disposed near the air inflow end of the disc facing surface;

a pair of second positive pressure-generating sections which are disposed separately in a breadth direction of the disc facing surface orthogonal to the longitudinal direction in a side of the air outflow end, the pair of second positive pressure-generating sections being separated from the first positive pressure-generating section of the disc facing surface, wherein a size from an end of each of the pair of second positive pressure-generating sections in a side of the air outflow end to the air outflow end on the disc facing surface is 20% or more of a size in the longitudinal direction of the disc facing surface;

a negative pressure-generating section which is disposed in an air outflow end side from the first positive pressure-generating section of the disc facing surface; and a third positive pressure-generating section which is disposed in an air outflow end side from the negative pressure-generating section of the disc facing surface and has a maximum size, which is 25.0% or less of a longitudinal size of the disc facing surface, in a same direction as the longitudinal direction and a maximum size, which is 45.0% or more and 57.1% or less of a breadth size of the disc facing surface, in a direction orthogonal to the longitudinal direction, the third positive pressure-generating section being accompanied by an intermediate step in a side of the negative pressure-generating section.

2. A head assembly, comprising:

a femto slider which is substantially rectangular and has a disc facing surface with an air inflow end at one end in a longitudinal direction thereof and an air outflow end at another end in the longitudinal direction thereof, the femto slider including: a first positive pressure-generating section disposed near the air inflow end of the disc facing surface; a pair of second positive pressure-generating sections disposed separately in a breadth direction of the disc facing surface orthogonal to the longitudinal direction in a side of the air outflow end, the pair of second positive pressure-generating sections being separated from the first positive pressure-generating section of the disc facing surface, wherein a size from an end of each of the pair of second positive pressure-generating sections in a side of the air outflow end to the air outflow end on the disc facing surface is 20% or more of a size in the longitudinal direction of the disc facing surface; a negative pressure-generating section disposed in an air outflow end side from the first positive pressure-generating section of the disc facing surface; and a third positive pressure-generating section disposed in an air outflow end side from the negative pressure-generating section of the disc facing surface and has a maximum size, which is 25.0% or less of a longitudinal size of the disc facing surface, in a same direction as the longitudinal direction and a maximum size, which is 45.0% or more and 57.1% or less of a breadth size of the disc facing surface, in a direction orthogonal to the longitudinal direction, the third positive pressure-generating section being accompanied by an intermediate step in a side of the negative pressure-generating section;

a head element which is disposed in the air outflow end of the femto slider;

a suspension member which is disposed on a surface opposite to the disc facing surface of the femto slider; and an arm member which is disposed in the suspension member opposite to a side where the femto slider is positioned.

3. A disc apparatus, comprising:

a head assembly, including: a) a femto slider which is substantially rectangular and has a disc facing surface with an air inflow end at one end in a longitudinal direction thereof and an air outflow end at another end in the longitudinal direction thereof, the femto slider including: a first positive pressure-generating section disposed near the air inflow end of the disc facing surface; a pair of second positive pressure-generating sections disposed separately in a breadth direction of the disc facing surface orthogonal to the longitudinal direction in a side of the air outflow end, the pair of second positive pressure-generating sections being separated from the first positive pressure-generating section of the disc facing surface, wherein a size from an end of each of the pair of second positive pressure-generating sections in a side of the air outflow end to the air outflow end on the disc facing surface is 20% or more of a size in the longitudinal direction of the disc facing surface; a negative pressure-generating section disposed in an air outflow end side from the first positive pressure-generating section of the disc facing surface; and a third positive pressure-generating section disposed in an air outflow end side from the negative pressure-generating section of the disc facing surface and has a maximum size, which is 25.0% or less of a longitudinal size of the disc facing surface, in a same direction as the longitudinal direction and a maximum size, which is 45.0% or more and 57.1% or less of a breadth size of the disc facing surface, in a direction orthogonal to the longitudinal direction, the third positive pressure-generating section being accompanied by an intermediate step in a side of the negative pressure-generating section; b) a head element which is disposed in the air outflow end of the femto slider; c) a suspension member which is disposed on a surface opposite to the disc facing surface of the femto slider; and d) an arm member which is disposed in the suspension member opposite to a side where the femto slider is positioned;

a disc positioned to face the disc facing surface of the femto slider possessed by the head assembly;

a spindle motor which rotates the disc; and a voice coil motor which pivots the arm member of the head assembly to move the femto slider in a radial direction of the disc.

* * * * *